United States Patent [19]

Yount et al.

[11] Patent Number: 4,683,532
[45] Date of Patent: Jul. 28, 1987

[54] REAL-TIME SOFTWARE MONITOR AND WRITE PROTECT CONTROLLER

[75] Inventors: Larry J. Yount, Scottsdale; Nicholas J. Wilt, Phoenix; Bryan H. Hill, Phoenix; Donald A. Peterson, Jr., Phoenix, all of Ariz.

[73] Assignee: Honeywell Inc., Minneapolis, Minn.

[21] Appl. No.: 677,275

[22] Filed: Dec. 3, 1984

[51] Int. Cl.⁴ .............................................. G06F 11/30
[52] U.S. Cl. .................................................... 364/200
[58] Field of Search ........................ 371/19, 57, 62; 364/200 MS File, 900 MS File

[56] References Cited

U.S. PATENT DOCUMENTS 3,814,919 6/1974 Repton et al. ................... 364/200 X
3,858,182 12/1974 Delagi et al. ........................ 364/200

Primary Examiner—Raulfe B. Zache
Attorney, Agent, or Firm—Albin Medved

[57] ABSTRACT

Verification of proper operation of computer programs executing in a central processor and protection of critical data is accomplished by an independent software monitor which accepts data keys from the executing program and outputs defined legitimate codes in response thereto. Legitimate codes and selected portions of input data keys are compared to validate proper softward execution.

4 Claims, 2 Drawing Figures

REAL-TIME SOFTWARE MONITOR AND WRITE PROTECT CONTROLLER

BACKGROUND OF THE INVENTION

1. Field of the Invention

This invention pertains to an apparatus for independently verifying the proper execution of computer programs and protection of memory stored data to effect isolation of multiple softwares executed on a single central processor.

2. Description of the Prior Art

Most safety critical applications, such as aircraft flight control systems, have been implemented in analog hardware to avoid potential hazards that could result from faulty software execution.

Unlike functions implemented in analog hardware, software functions are effectively time-shared with other software functions executed on the same computer. Accordingly, individual software functions are difficult to isolate. Various techniques have been used to help verify proper execution of software.

Monitoring of software execution and protection of data has been traditionally accomplished in the software itself. Examples of the software associated monitoring are the heartbeat monitor and the software ticket check. In the heartbeat monitor, the software outputs a pulse at regular intervals to verify real-time operation. However, it is possible that a software or hardware failure will also continue to output the monitor pulse. With a software ticket check monitor, each module outputs a ticket in the form of a binary word or flag to indicate its execution. The monitor module attempts to verify the software's execution through the receipt of the tickets. These techniques are therefore under the direct control of the same processor they were designed to monitor. Therefore, it is difficult to ascertain whether software performing critical safety related functions is executing properly or that program data has not been altered.

Traditionally, software is divided into small functional blocks of executable code called software modules. Each software module can be categorized as critical, essential or non-critical in accordance with definitions contained in Radio Technical Commission for Aeronautics DO-178. When a software package containing modules that fall into more than one of these software categories is executed by a common processor, some method of isolation is required to provide clear and distinct partitioning of the software criticality categories. Otherwise, the criticality of all the modules within the package default to that of the most critical of the group relative to documentation, testing, and verification requirements.

In order to fully isolate software of different criticality levels, two basic problems must be solved.

1. Execution Verification—Software execution must be verified to protect against the possibility of a noncritical software module erroneously disturbing program flow thereby causing the proper calling sequence or the execution rate of critical modules to be affected.

2. Data Isolation Verification—Critical data must be protected to prevent noncritical software from erroneously altering the scratch pad memory locations.

Thus, a substantive problem in implementing flight safety functions in software is verifying that critical software modules, in a multi-criticality software package, are fully executed in the proper sequence with uncontaminated data.

The Real-Time Software Monitor and Write Protect Controller of the present invention verifies software execution in an independent manner. It isolates and protects critical data from software of lower criticality levels, thereby allowing separation of software within a single processing system into the three levels of criticality as described in Radio Technical Commission for Aeronautics (RTCA) document DO-178. The present invention verifies that the software executes in the proper sequence and that the entire software task is completed within a specified time.

SUMMARY OF THE INVENTION

The present invention is an apparatus for independently verifying the proper execution of computer programs and for protecting selected areas of memory from inadvertent alteration such that there is positive isolation and protection of data for multiple programs executing in a single central processor.

An independent software monitor accepts a sequence of data keys from software executing in a central processor. The sequence of data keys generate addresses to a read-only-memory which outputs a plurality of legitimate codes to be compared with selected portions of the input data keys in order to verify the validity of the input data key and hence the proper operation of software executing in a central processor. Additionally, selected areas of memory are isolated by a write protect signal thereby precluding inadvertent alteration of critical data.

DESCRIPTION OF THE PREFERRED EMBODIMENT

Figure 1:
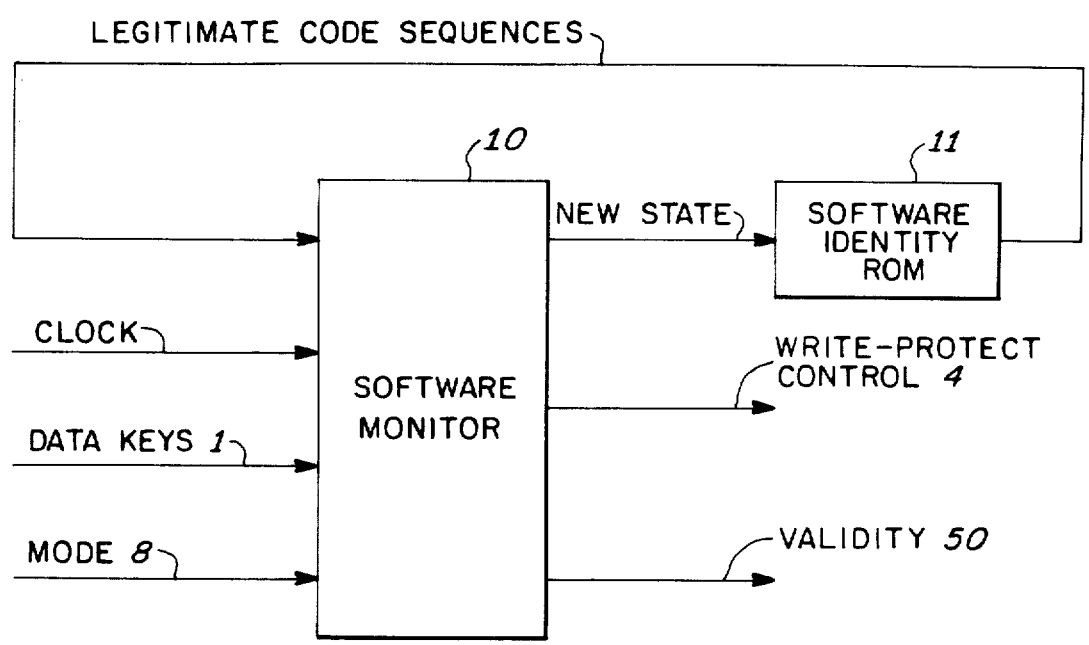
FIG. 1 is a block diagram of the implementation of the present invention.

As shown in FIG. 1, the present invention consists of the Software Monitor Integrated Circuit 10 and a Software Identify Read Only Memory (ROM) 11. Each software module, upon entry and exit from the central processor (CPU), not shown, writes a binary data key 1 to the software monitor integrated circuit 10. Software monitor 10 compares data key 1 against defined legitimate code sequences (including branching) stored in the Software Identity Read Only Memory (ROM) 11. Each time a legitimate data key 1 is written to software monitor 10, software monitor 10 transitions to a new state. Software monitor 10 and ROM 11 therefore form a state machine. Thus, the software monitor 10 verifies that data key 1 is correct and is in the proper sequence. If a data key 1 is entered out of sequence, a software failure is annunciated on lead 50. Write-protect control 4, corresponding to the current executing module, is issued to the system scratch pad memory, not shown, to protect critical data from inadvertent alteration.

Legitimate sequences of data keys 1 can include branching. Since multiple legitimate sequences of data keys 1 may be optionally defined, the software monitor integrated circuit 10 has a mode input 8. If more than one legitimate sequence has been defined, mode input 8 determines which sequences are legitimate. For example, in a flight control system application, cruise sequences are excluded from the legitimate sequence set during the landing mode.

In most applications there may be several independent software tasks to be executed, each with a different repetition rate. In the present invention, an individual software task may be temporarily suspended and another task resumed at the exact point at which it was last suspended. Each individual task is thus monitored by software monitor 10 for completion at the defined repetition rate.

Figure 2:
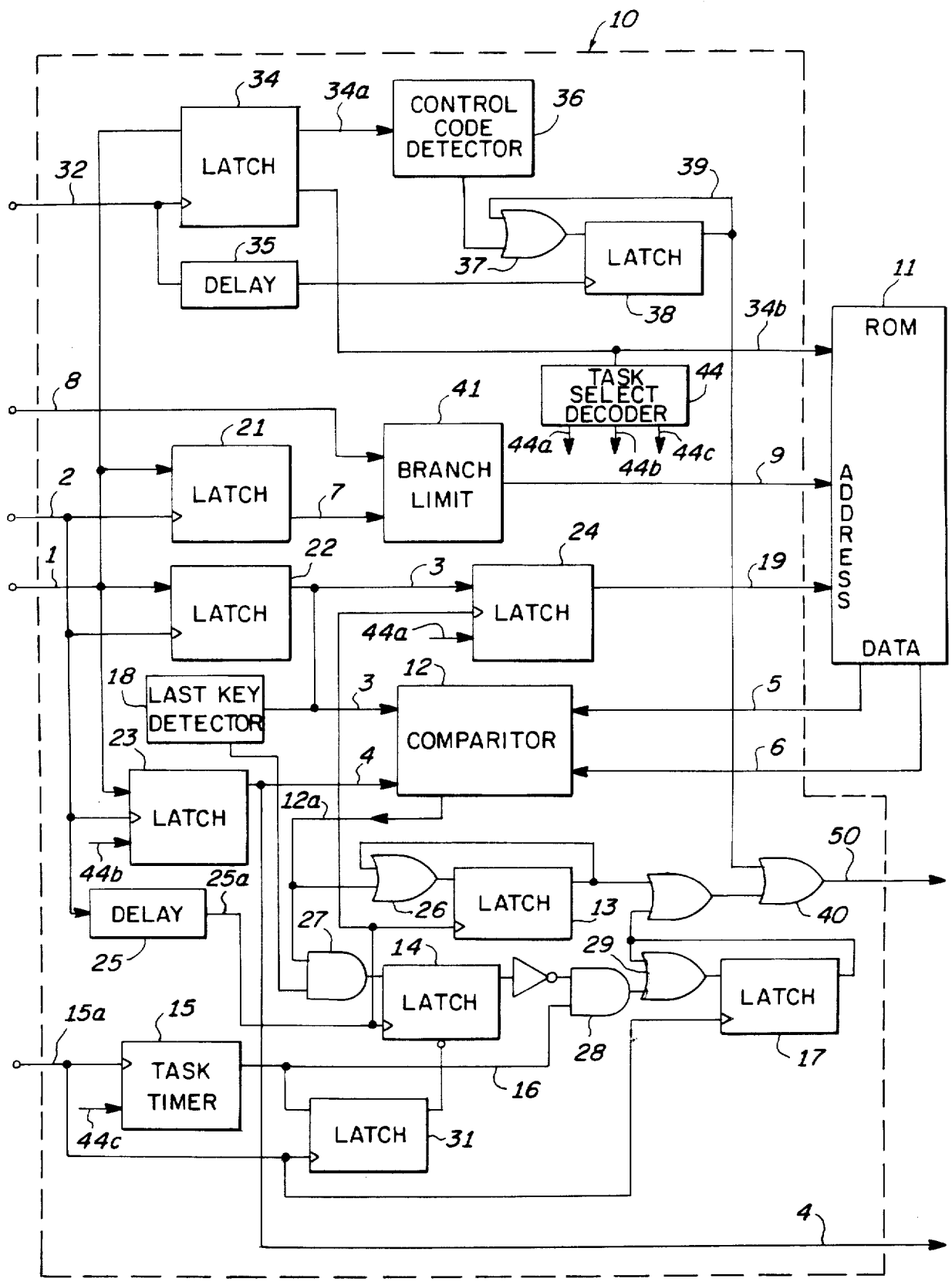
FIG. 2 is a detailed block diagram of the software monitor integrated circuit.

Referring now to FIG. 2, a detailed description of the present invention will be provided. The present invention includes software monitor integrated circuit 10 and software identity read only memory (ROM) 11. At the beginning and end of execution of each software module in the central processor (CPU), not shown, a data key 1 is provided to software monitor 10 and thence simultaneously to conventional D-type latches 21, 22, 23 and 34. Data key 1 contains key code 3, branch code 7 and write protect code 4. Key code 3 is a binary code typically containing 8 bits which uniquely identifies key code 3. Branch code 7 is a binary code typically containing 2 bits specifying the branch in program control that is to be executed. Write protect code consisting typically of 4 bits specifies which areas of scratch pad memory may be accessed by the CPU. Memory write protection remains in effect until changed by receipt of a subsequent data key 1.

Data key 1 is strobed into latches 21, 22 and 23 when write pulse signal 2 is present. Data key 1 is strobed into latch 34 when control pulse 32 is present. Branch code 7 is output from latch 21 to logical AND circuit 41 upon input of data key 1 and write pulse 2. Branch code 7 defines which program flow branch is associated with a given data key 1. Mode signal 8 is also input to AND circuit 41. AND circuit 41 acts to optionally prohibit selected branching and outputs branch control signal 9. Branch control signal 9 and old key code signal 19 form the address of the software identity ROM 11. Old key code 19 corresponding to the immediately preceding key code 3 is output from latch 24 to software identity ROM 11 upon input of key code 3 and delayed write pulse 25a. Legitimate key code 5 and legitimate write control code 6 are outputs of software identity ROM 11 as defined by branch control 9 and old key code 19 address.

Immediately upon data key 1 being written to software monitor 10, key code 3 is output from latch 22 to comparitor 12, and write protect code 4 is output from latch 23 to comparitor 12.

Software identity ROM 11 outputs legitimate key code 5 and legitimate write control code 6 to comparitor 12. Key code 3, write protect control code 4 are compared in comparitor 12 with legitimate key 5 and legitimate write protect code 6. If the comparison is not valid, latch 13 is set, by an output from comparitor 12 on lead 12a acting on OR gate 26, indicating a fault. The clock input to latch 13 is the delayed write pulse 25a. The length of delay 25, which receives its input from write pulse 2, is typically several nanoseconds. Delay 25 must be long enough to accomodate the internal integrated circuit delays associated with comparitor 12. If latch 13 is set indicating an invalid comparison of the inputs to comparitor 12, it remains set until cleared by a system reset, not shown.

In addition to monitoring all data keys 1 written to it as discussed above, the software monitor 10 must confirm that a defined sequence of data keys 1 was received within the allotted interval of time. When last-key-detector 18 indicates, by an output to AND gate 27, that the last key code 3 has been received and comparator 12 confirms that data keys 1 are in the proper sequence, a latch 14 is set, by an output from comparitor 12 on lead 12a acting on AND gate 27, indicating that the last valid key code 3 of a sequence has been received. The time period allocated for software task completion is monitored by the task-timer 15 which receives a time-base input 15a from the CPU. If, when the task-timer outputs end-of-task signal 16, latch 14 has not been set then latch 17 is set, via AND gate 28 and OR gate 29, indicating a fault.

The above description applies to monitoring of a single sequence of data keys 1 corresponding to a single task. Monitoring multiple tasks, each with a different repetition rate, may be accomplished by the present invention by switching between tasks. Data key 1 is written to the software monitor 10 via a control-pulse 32 which strobes data into latch 34. Latch 34 outputs control code 34a to control code detector 36. If control code 34a is invalid, latch 38 is set via OR gate 37, whose output is strobed into latch 38 by the output from delay 35, and an invalid signal 39 is output to OR gate 40. Latch 34 also outputs task select code 34b which in a multiple task environment becomes part of the address to software identity ROM 11 and is input to task select decoder 44. Since latch 23, latch 24 and task timer 15 must be dedicated to a single task, multiples of latch 23, latch 24 and task times 15 are provided but are not shown in FIG. 2. Task select decoder 44 enables one of n latches 23, latches 24 and task timers 15 depending on the information contained in task select code 34b.

The present invention, therefore, is a central processor independent apparatus that monitors software execution and protects data. Improper software execution is thus immediately detected and reported with a high degree of reliability and confidence.

While the invention has been described in its preferred embodiments, it is to be understood that the words which have been used are words of description rather than limitation and that changes may be made within the purview of the appended claims without departing from the true scope and spirit of the invention in its broader aspects.

We claim:

1. Real-time software monitor and write protect apparatus comprising:
    means for providing a sequence of memory addresses in response to input of a sequence of data keys, said data keys occurring at selected times during execution of a program in a central processor,
    means for sequentially accepting said memory addresses and providing in response thereto a plurality of sequential legitimate codes,
    means for sequentially comparing said legitimate codes with selected portions of said data keys to provide therefrom a signal indicating the validity of said keys, and
    means for providing software isolation by specifying areas of memory that may not be altered in response to said sequence of data keys.

2. Apparatus as recited in claim 1 further comprising:
    means for providing a signal indicating occurrance of a last data key in said sequence of data keys,
    means for providing a signal indicating valid completion of a sequence of data keys in response to receipt of said signal indicating validity of data keys and said signal indicating occurrance of last data key in a sequence.

3. Apparatus as recited in claim 2 further comprising:
means for timing duration of a software task and for providing a signal representative of end of task occurrance, and
means for providing a signal indicating the valid execution software task based on a mutual occurrance of said end of task signal and said signal indicating valid completion of a sequence of data keys.

4. Apparatus as recited in claim 3 further comprising:
means for providing a signal designating a selected software task from a plurality of software tasks, said task-select signal becoming part of said sequence of memory addresses, and for providing a control code in response to input of said sequence of data keys, and
means responsive to said control code for providing a signal indicating the validity of said control code.

* * * * *